United States Patent

Ando et al.

[11] Patent Number: 5,556,618
[45] Date of Patent: Sep. 17, 1996

[54] ANTIBACTERIAL ELECTRET MATERIAL

[75] Inventors: Katsutoshi Ando; Masanori Takahashi; Goro Kondou, all of Otsu, Japan

[73] Assignee: Toray Industries, Inc., Tokyo, Japan

[21] Appl. No.: 108,644

[22] PCT Filed: Jan. 8, 1993

[86] PCT No.: PCT/JP93/00016

§ 371 Date: Dec. 21, 1993

§ 102(e) Date: Dec. 21, 1993

[87] PCT Pub. No.: WO93/14510

PCT Pub. Date: Jul. 22, 1993

[30] Foreign Application Priority Data

Jan. 8, 1992 [JP] Japan .................... 4-001722

[51] Int. Cl.⁶ .................................................. A61K 47/30
[52] U.S. Cl. .............. 424/78.08; 424/404; 524/323; 524/327; 524/328; 524/329
[58] Field of Search ............. 524/323, 327, 524/328, 329; 424/78.08, 404

[56] References Cited

U.S. PATENT DOCUMENTS 4,215,682  8/1980  Kubik et al. .................... 128/205.29
5,057,710  10/1991  Nishiura et al. .................... 307/400
5,112,677  5/1992  Tani et al. .................... 428/240

OTHER PUBLICATIONS

C.A. 88:018896 Toray Ind. Jul. '87.
C.A. 108:96155 Ando et al Jul. '87.
C.A. 113:33268 Nishiura et al May '88.
J62282077 (Chem. Abstract) Toray Ind. Dec. '87.
J57021472-A (Mitsui et al) Feb. '82–C.A. 117:192866 Neaga et al. '91.

*Primary Examiner*—Peter F. Kulkosky
*Attorney, Agent, or Firm*—Nikaido, Marmelstein, Murray & Oram LLP

[57] ABSTRACT

An antibacterial electret material which consists of a synthesized organic polymer having a volume resistivity of not less than $10^{13}$ $\Omega \cdot cm$ and containing 0.01 to 2% by weight of one kind of electret stabilizer selected from the group composed of a hindered amine compound, a nitrogen-containing hindered phenol compound, a metallic salt hindered phenol compound, a phenol compound, a sulfur compound and a phosphorus compound and 0.1 to 4% by weight of metal ion-containing inorganic compound, and which has a surface density of charge of not less than $1 \times 10^{-10}$ coulomb/cm².

12 Claims, 1 Drawing Sheet

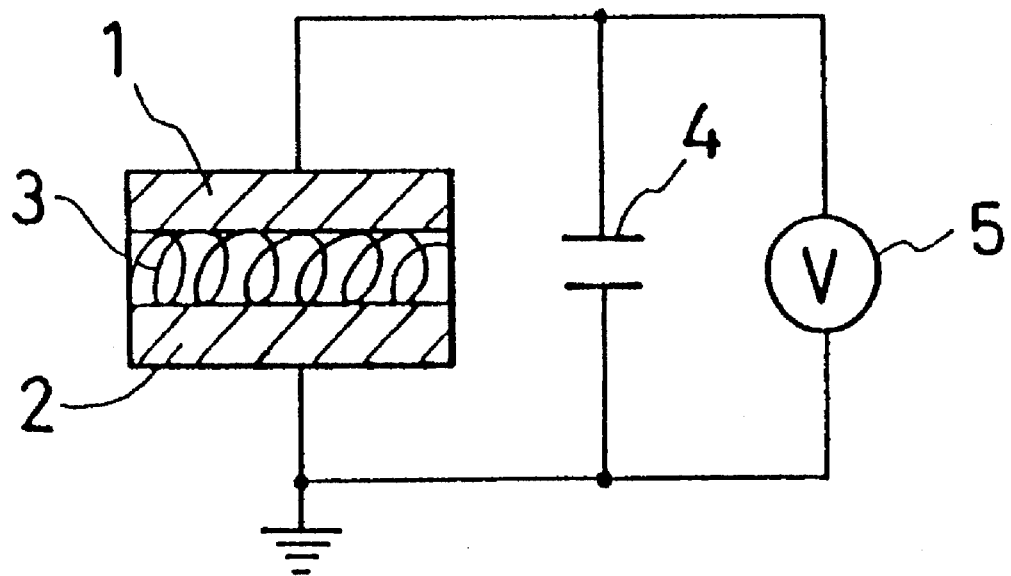

ANTIBACTERIAL ELECTRET MATERIAL

TECHNICAL FIELD

The present invention relates to a material having both an antibacterial activity and an electret property and useable in the fields of filters, food packaging, medical materials, working clothes, and so forth.

BACKGROUND ART

Japanese patent application Kokai publication No. 62-42716 discloses as an antibacterial electret material a filter material formed by subjecting the surface of a fiber to an antibacterial treatment with an antibacterial agent and further subjecting the treated fiber to a treatment for imparting an electret property. In this filter material, however, the volume resistivity of the surface of the fiber was reduced because the antibacterial treatment was conducted by using an organic antibacterial agent and a surfactant for dispersing the antibacterial agent. For this reason, the filter material had a problem that, even after the treatment for imparting an electret property, the quantity of electric charge was small and the charge decayed rapidly.

Japanese patent application Kokai publication No. 3-186309 discloses an air filter comprising an antibacterial nonwoven fabric composed of a fiber and, added thereto, an inorganic antibacterial zeolite and an electret nonwoven fabric laminated on the antibacterial nonwoven fabric. Although this air filter could suppress the propagation of trapped bacteria on the side of the antibacterial nonwoven fabric, it was disadvantageous in that, on the side of the electret nonwoven fabric, trapped bacteria propagated and emitted an offensive odor or rescattered to contaminate the atmosphere of a room. Further, since the electret property was not imparted to the air filter as a whole, the performance of the filter lowered.

Japanese patent application Kokai publication No. 62-42715 discloses a composite material comprising an electret nonwoven material and, superimposed thereon, a nonwoven fabric subjected to an antibacterial treatment. This composite material, however, had a similar drawback.

Studies conducted by the present inventors revealed that the process wherein the formed nonwoven fabric was subjected first to an antibacterial treatment and then to a treatment for imparting an electret property had a fundamental problem that it was difficult to impart a good electret property and, further, since the process time was lengthened, the product cost was increased.

On the other hand, the process wherein the formed nonwoven fabric was subjected first to a treatment for imparting an electret property and then to an antibacterial treatment had a drawback that the antibacterial treatment deteriorated the electret performance and a problem that the process time was similarly lengthened and hence the product cost was increased.

DISCLOSURE OF THE INVENTION

An object of the present invention is to provide an antibacterial electret material having a good charge stability and an electret property while maintaining an antibacterial activity.

The antibacterial electret material of the present invention which can attain the above-described object is characterized by having a surface charge density of $1 \times 10^{-10}$ C/cm$^2$ or above and comprising a synthetic organic polymer having a volume resistivity of $10^{13}$ $\Omega$·cm or above and containing 0.01 to 2% by weight of at least one electret stabilizer selected from the group consisting of a hindered amine compound, a nitrogenous hindered phenol compound, a metallic salt hindered phenol compound, a phenol compound, a sulfur compound and a phosphorus compound and 0.1 to 4% by weight of a metal-ion-containing inorganic compound.

BRIEF DESCRIPTION OF THE DRAWINGS

FIG. 1 is a schematic diagram showing a method of measuring the surface charge density.

BEST MODE FOR CARRYING OUT THE INVENTION

In the present invention, examples of the synthetic organic polymer having a volume resistivity of $10^{13}$ $\Omega$·cm or above include polyolefins, polyesters, fluororesins, acrylic resins and polyamide resins, among which polyolefin polymers, such as polyethylene and polypropylene, are preferred.

The antibacterial electret material comprising the above-described synthetic organic polymer contains 0.01 to 2% by weight of an electret stabilizer and 0.1 to 4% by weight of a metal-ion-containing inorganic compound as an antibacterial agent.

In the present invention, all the contents are expressed in % by weight.

The electret stabilizer is preferably at least one compound selected from the group consisting of a hindered amine compound, a nitrogenous hindered phenol compound, a metallic salt hindered phenol compound, a phenol compound, a sulfur compound and a phosphorus compound.

Examples of the hindered amine compound include poly[{(6-(1,1,3,3-tetramethylbutyl)imino-1,3,5-triazine-2,4-diyl}(2,2,6,6-tetramethyl-4-piperidyl)-imino}hexamethylene{(2,2,6,6-tetramethyl-4-piperidyl)imino}], dimethyl succinate/1-(2-hydroxyethyl)-4-hydroxy- 2,2,6,6-tetramethylpiperidine polycondensate, and bis(1,2,2,6,6-pentamethyl-4-piperidyl) 2-(3,5-di-t-butyl-4-hydroxybenzyl)-2-n-butylmalonate.

Examples of the nitrogenous hindered phenol compound include 1,3,5-tris(4-t-butyl-3-hydroxy-2,6-dimethylbenzyl)isocyanuric acid and 1,3,5-tris(3,5-di-t-butyl-4-hydroxybenzyl)isocyanuric acid.

Examples of the metallic salt hindered phenol compound include a calcium salt of 3,5-di-t-butyl-4-hydroxybenzyl monoethylphosphonate, a nickel salt of 3,5-di-t-butyl-4-hydroxybenzyl monoethylphosphonate and a magnesium salt of these compounds.

Examples of the phenol compound include 1,3,5-trimethyl-2,4,6-tris(3,5-di-t-butyl-4-hydroxybenzyl)benzene, pentaerythrityl tetrakis[3-(3,5-di-t-butyl-4-hydroxyphenyl)propionate], octadecyl 3-(3,5-di-t-butyl-4-hydroxyphenyl)propionate.

Examples of the sulfur compound include distearyl thiodipropionate and dilauryl thiodipropionate.

Examples of the phosphorus compound include distearyl pentaerythritol diphosphite.

Although the effect of the present invention can be attained when each of the electret stabilizers is contained alone in the synthetic organic polymer, a better effect can be attained when the electret stabilizers are used in combination of two or more of them. Although the reason has not been elucidated yet, it is conceivable to reside in that the individual electret stabilizers are different form each other in the charge holding mechanism and a combination of different charge holding mechanisms contributes to an increase in the effect of stabilizing the electret.

In the present invention, examples of the metal-ion-containing inorganic compound as the antibacterial agent include metal-ion-containing zeolite, soluble glass, zirconium phosphate, titanium phosphate and tin phosphate, among which metal-ion-containing zeolite, soluble glass and zirconium phosphate are particularly preferred.

Examples of the metal ion of the metal-ion-containing inorganic compound include silver, copper, zinc, mercury, tin, lead, bismuth, chromium and thallium ions, among which silver ion is particularly useful, and the silver ion may be in the form of a complex ion comprising the silver ion and other metal ion. Further, a combination of various antibacterial agents is also,effective.

The soluble glass comprises $B_2O_3$, $SiO_2$, $Na_2O$ or the like and when silver ion is to be carried thereon $Ag_2O$ is preferred therefor.

The synthetic organic polymer material containing the electret stabilizer and the metal-ion-containing inorganic compound (hereinafter referred to as the "antibacterial agent") is formed into a fiber, film, woven fabric, nonwoven fabric, paper or knit. The conventional forming means, such as yarn making, texturing, papermaking or film formation, may be applied therefor.

The electret stabilizer and the antibacterial agent can be incorporated into the synthetic organic polymer by a method called "incorporation". For example, the incorporation can be conducted by mixing them into the synthetic organic polymer in the form of a chip or feeding them into an extruder.

The formed fiber, woven fabric, knit, nonwoven fabric paper film or other material is then subjected to the conventional treatment for imparting an electret property, for example, a treatment for imparting an electret property under a high d.c. voltage to provide an electret material having a high charge density, i.e., usually having a surface charge density of $1 \times 10^{-10}$ C/cm² or above.

According to the finding of the present inventors, when the material is subjected to the treatment for imparting an electret property in the form of a sheet, such as a woven fabric, nonwoven fabric, paper or film, the resultant electret material has a surface charge density of $2 \times 10^{-10}$ to $1 \times 10^{-8}$ C/cm². Further in the sheet, the electric polarity of one surface thereof is different from that of the other surface.

The contents of the electret stabilizer and the antibacterial agent are important for attaining an electret property while maintaining an antibacterial activity. The content of the electret stabilizer should be 0.01% by weight or more from the viewpoint of the stability of the electret. However, if the content is excessively high, the effect lowers, so that the upper limit of the electret stabilizer is preferably 2% by weight.

The content of the antibacterial agent should be 0.1% by weight or more from the viewpoint of the antibacterial activity. For the antibacterial agent as well, if the content is excessively high, the electret property is deteriorated, so that the upper limit of the content is preferably 4% by weight.

The antibacterial electret material of the present invention is constructed so that the weight per unit area is preferably 10 to 200 g/m², still preferably 20 to 100 g/m². That is, it is relatively light. Such a light weight cannot be attained when a material having an antibacterial activity and a material having an electret property are separately prepared and then combined with each other, because the total weight becomes large. By contrast, the antibacterial electret material of the present invention is light while maintaining both the properties, which renders it significant.

In the present invention, the surface charge density of the electret is measured by the method illustrated in FIG. 1. In the figure, an electret sample 3 is sandwiched between electrodes 1 and 2 and an induced charge is stored in a known capacitor 4. The potential is measured with an electrometer 5 and the surface charge density is determined according to the following equation:

surface charge density $Q = C \times V$ wherein C is a capacity of a known capacitor (farad), V is a voltage (volt), and Q is a surface charge density, (coulomb/cm²).

Further, in the present invention, the antibacterial activity is measured by the shake flask method. Specifically, a sample was thrown into a, suspension of a test bacterium (*Staphylococcus aureus*) and the suspension was shaken in a hermetically sealed container at a rate of 150 times/min for 1 hour. Thereafter the number of vial cells was counted to determine the percentage reduction of the cells based on the initial number of cells.

EXAMPLE 1

A melt-blown nonwoven fabric having a weight per unit area of 100 g/m² was produced from a polypropylene having a volume resistivity of $10 \times 10^{16}$ Ω·cm. In the production of the fabric, 0.2% by weight of a calcium salt of 3,5-di-t-butyl-4-hydroxybenzyl monoethylphosphonate (a hindered phenol compound) and 0.2% by weight of pentaerythrityl tetrakis[3-(3,5-di-t-butyl-4-hydroxyphenyl)propionate] (a phenol compound) were incorporated as the electret stabilizers into the polypropylene and 0.8% by weight of a zeolite carrying a silver ion was incorporated as the antibacterial agent into the polypropylene. A voltage of 30 kV was applied to the nonwoven fabric for 1 min to impart an electret propertly thereto.

The electret nonwoven fabric had a surface charge density of $8 \times 10^{-10}$ C/cm², and the two surfaces had respectively positive and negative polarities. The antibacterial activity was measured by the shake flask method. As a result, the percentage reduction was found to be 75%.

For comparison, the above-described polypropylene was used to produce a conventional melt-blown nonwoven fabric containing neither an electret stabilizer nor and antibacterial agent, and the antibacterial activity was measured. As a result, the percentage reduction was found to be 3%.

When the electret nonwoven fabric provided in Example 1 was used as a filter, the efficiency of trapping bacteria was 95%. Even after the use of the filter within a building for half a year, the filter brought about neither generation of bacteria nor occurrence of an offensive odor.

On the other hand, the conventional melt-blown nonwoven fabric brought about occurrence of an offensive odor.

EXAMPLE 2

A spunbonded nonwoven fabric was produced from a polypropylene having a volume resistivity of $10 \times 10^{16}$ Ω·cm. In the production of this fabric, 0.1% by weight of poly[{(6-(1,1,3,3-tetramethylbutyl)imino-1,3,5-triazine-2,4-diyl}(2, 2,6,6-tetramethyl-4-piperidyl)imino}hexamethylene{(2,2,6, 6-tetramethyl-4-piperidyl)imino)}] (a hindered amine compound) and 0.1% by weight of pentaerythrityl tetrakis [3-(3,5-di-t-butyl-4-hydroxyphenyl)propionate] (a phenol compound) were incorporated as the electret stabilizers into the polypropylene, and 1% by weight of a water-soluble glass carrying a silver ion was incorporated as the antibacterial agent into the polypropylene.

A voltage of 25 kV was applied to the nonwoven fabric for 1 min to impart an electret property thereto. The electret nonwoven fabric had a surface charge density of $5 \times 10^{31\ 10}$ $C/cm^2$, and the two surfaces had respectively positive and negative polarities. The antibacterial activity as measured by the shake flask method was 65% in terms of the percentage reduction.

This electret nonwoven fabric was used as a packaging material for oranges. As a result, it did not bring about generation of fungi for 3 months. On the other hand, occurrence of fungi was observed in one month for the conventional spunbonded nonwoven fabric.

EXAMPLE 3

A melt-blown nonwoven fabric having a weight per unit area of 50 $g/m^2$ was produced by using a raw material comprising a polypropylene having a volume resistivity of $10 \times 10^{16}$ $\Omega \cdot cm$ and, incorporated therein as the stabilizers, 0.1% by weight of a calcium salt of 3,5-di-t-butyl-4-hydroxybenzyl monoethylphosphonate (a hindered phenol compound) and 0.1% by weight of pentaerythrityl tetrakis [3-(3,5-di-t-butyl-4-hydroxyphenyl)propionate] (a phenol compound) and, further incorporated therein as the antibacterial agent, 1.1% by weight of zirconium phosphate carrying a silver ion.

A voltage of 30 kV was applied to the nonwoven fabric for 1 min to impart an electret property thereto. The electret nonwoven fabric had a surface charge density of $9 \times 10^{-10}$ $C/cm^2$, and the two surfaces had respectively positive and negative polarities. The antibacterial activity as measured by the shake flask method was 72% in terms of the percentage reduction.

For comparison, the above-described polypropylene was used to produce a melt-blown nonwoven fabric containing neither an electret stabilizer nor an antibacterial agent, and the antibacterial activity was measured. As a result, the percentage reduction was found to be 4%.

COMPARATIVE EXAMPLE 1

A melt-blown nonwoven fabric comprising a polypropylene having a weight per unit area of 100 $g/m^2$ was produced in the same manner as that of Example 1, except that no antibacterial agent was incorporated. Specifically, in the melt-blown nonwoven fabric, 0.2% by weight of 3,5-di-t-butyl-4-hydroxybenzyl monoethylphosphonate (a metallic salt hindered phenol) and 0.1% by weight of pentaerythrityl tetrakis[3-(3,5-di-t-butyl-4-hydroxyphenyl)propionate] (a phenol compound) were incorporated as the electret stabilizers. A voltage of 30 kV was applied to the nonwoven fabric for 1 min to impart an electret property thereto. The electret nonwoven fabric had a surface charge density of $8.5 \times 10^{-10}$ $C/cm^2$. However, the antibacterial activity as measured by the shake flask method was 4% in terms of the percentage reduction so that the antibacterial activity was unsatisfactory.

COMPARATIVE EXAMPLE 2

A melt-blown nonwoven fabric having a weight per unit area of 100 $g/m^2$ was produced from a polypropylene having a volume resistivity of $10 \times 10^{16}$ $\Omega \cdot cm$. 0.5% by weight of 2,4,4-trichloro-2'-hydroxydiphenyl ether (an antibacterial agent described in Japanese patent application Kokai publication No. 62-42716), together with an acrylic resin as an anchoring agent, was deposited as an electret stabilizer on the melt-blown nonwoven fabric. A voltage of 25 kv was applied to the nonwoven fabric for 1 min to impart an electret property thereto. The electret nonwoven fabric had a surface charge density of $0.2 \times 10^{-10}$ $C/cm^2$, that is, the electret property was hardly imparted.

EXAMPLE 4

A melt-blown nonwoven fabric having a weight per unit area of 100 $g/m^2$ was produced from a polypropylene having a volume resistivity of $10 \times 10^{16}$ $\Omega \cdot cm$. In the production of the nonwoven fabric, 0.15% by weight of 1,3,5-tris(4-t-butyl- 3-hydroxy-2,6-dimethylbenzyl)isocyanuric acid (a nitrogenous hindered phenol compound) as the electret stabilizer and 1% by weight of a zeolite carrying a silver ion as the anchoring antibacterial agent were incorporated into the polypropylene. A voltage of 30 kV was applied to the nonwoven fabric for 1 min to impart an electret property thereto. The surface charge density and antibacterial activity of the electret nonwoven fabric were measured by the above-described methods. As a result, it was found that the surface charge density and the antibacterial activity as measured by the shake flask method were $5 \times 10^{-10}$ $C/cm^2$ and 70%, respectively. That is, the electret nonwoven fabric was satisfactory in both the properties. EXAMPLE 5

A melt-blown nonwoven fabric having a weight per unit area of 100 $g/m^2$ was produced from a polypropylene having a volume resistivity of $10 \times 10^{16}$ $\Omega \cdot cm$. In the production of the nonwoven fabric, 0.4% by weight of distearyl thiodipropionate (a sulfur compound) as the electret stabilizer and 0.6% by weight of a zeolite carrying a silver ion as an antibacterial agent were incorporated into the polypropylene. A voltage of 30 kv was applied to the nonwoven fabric for 1 min to impart an electret property thereto. The surface charge density and antibacterial activity as measured by the shake flask method were $6 \times 10^{-10}$ $C/cm^2$ and 68% in terms of the percentage seduction, respectively. That is, the electret nonwoven fabric was satisfactory in both the properties.

EXAMPLE 6

A melt-blown nonwoven fabric having a weight per unit area of 100 $g/m^2$ was produced from a polypropylene having a volume resistivity of $10 \times 10^{16}$ $\Omega \cdot cm$. In the production of the nonwoven fabric, 0.2% by weight of distearyl pentaerythritol diphosphite (a phosphorus compound) as the electret stabilizer and 1.2% by weight of a water-soluble glass carrying a silver ion as the antibacterial agent were incorporated into the polypropylene. A voltage of 30 kV was applied to the nonwoven fabric for 1 min to impart an electret property thereto. The surface charge density and antibacterial activity as measured by the shake flask method were $7 \times 10^{-10}$ $C/cm^2$ and 67% in terms of the percentage reduction, respectively. That is, the electret nonwoven fabric was satisfactory in both the properties.

EXAMPLE 7

A melt-blown nonwoven fabric having a weight per unit area of 10 $g/m^2$ was produced from a polypropylene having a volume resistivity of $10 \times 10^{16}$ $\Omega \cdot cm$. In the production of the nonwoven fabric, 0.1% by weight of poly[{(6-(1,1,3,3-tetramethylbutyl)imino-1,3,5-triazine-2,4-diyl}(2,2,6,6-tetramethyl-4-piperidyl)-imino}hexamethylene{(2,2,6,6-tetramethyl-4-piperidyl)imino}] (a hindered amine compound) as the electret stabilizer and 1% by weight of zirconium phosphate carrying a silver ion as the antibacterial agent were incorporated into the polypropylene. A voltage of 30 kV was applied to the nonwoven fabric for 1 min to impart an electret property thereto. The surface charge density and antibacterial activity as measured by the shake flask method were $4\times10^{-10}$ C/cm$^2$ and 69% in terms of the percentage reduction, respectively. That is, the electret nonwoven fabric was satisfactory in both the properties.

EXAMPLE 8

A melt-blown nonwoven fabric having a weight per unit area of 100 g/m$^2$ was produced from a polypropylene having a volume resistivity of $10\times10^{16}$ $\Omega$·cm. In the production of the nonwoven fabric, 0.2% by weight of 3,5-di-t-butyl-4-hydroxybenzyl monoethylphosphonate (a metallic hindered phenol compound) as the electret stabilizer and 0.9% by weight of a zeolite carrying a silver ion as the antibacterial agent were incorporated into the polypropylene. A voltage of 30 kV was applied to the nonwoven fabric for 1 min to impart an electret property thereto. The surface charge density and antibacterial activity as measured by the shake flask method were $6\times10^{-10}$ C/cm$^2$ and 76% in terms of the percentage reduction, respectively. That is, the electret nonwoven fabric was satisfactory in both the properties.

EXAMPLE 9

A melt-blown nonwoven fabric having a weight per unit area of 100 g/m$^2$ was produced from a polypropylene having a volume resistivity of $10\times10^{16}$ $\Omega$·cm. In the production of the nonwoven fabric, 0.2% by weight of pentaerythrityl tetrakis[3-(3,5-di-t-butyl-4-hydroxyphenyl)propionate] (a phenol compound) as the antibacterial agent and 1% by weight of zirconium phosphate carrying a silver ion as the antibacterial agent were incorporated into the polypropylene. A voltage of 30 kV was applied to the nonwoven fabric for 1 min to impart an electret property thereto. The surface charge density and antibacterial activity as measured by the shake flask method were $4\times10^{-10}$ C/cm$^2$ and 70% in terms of the percentage reduction, respectively. That is, the electret nonwoven fabric was satisfactory in both the properties.

INDUSTRIAL APPLICABILITY

In the electret material of the present invention, the metal ion contained, in the antibacterial agent inhibits the growth of bacteria and microbial cells to exhibit an antibacterial effect and, at the same time, the electret stabilizer traps electric charges to exhibit an electret effect. In other words, the electret material of the present invention has a combination of an antibacterial activity with an electret property. Further, these charges remain stable even when environmental conditions, humidity and temperature vary, which renders the electret material of the present invention useable in making filters, packaging materials, agricultural materials, wipers, various covering materials, head-gear, medical materials, masks, and so forth.

What is claimed is:

1. An antibacterial electret material comprising a synthetic organic polymer having a volume resistivity of $10^{13}$ $\Omega$·cm or above mixed with 0.01 to 2% by weight of at least one electret stabilizer selected from the group consisting of a hindered amine compound, a nitrogenous hindered phenol compound, a metallic salt hindered phenol compound, a phenol compound, a sulfur compound and a phosphorus compound and 0.1 to 4% by weight of an antibacterial metal-ion-containing inorganic compound selected from the group consisting of a metal-ion-containing zeolite; a metal-ion-containing soluble glass and a metal-ion-containing zirconium phosphate, whereby antibacterial activity is increased as a result of the presence of said antibacterial metal-ion-containing compound, in comparison to an otherwise similar material which contains no antibacterial metal-ion-containing compound, said antibacterial electret material having a surface charge density of $1\times10^{-10}$ C/cm$^2$ or above.

2. An antibacterial electret material according to claim 1, wherein said synthetic organic polymer is an olefin polymer having a volume resistivity of $10^{15}$ $\Omega$·cm or above.

3. An antibacterial electret material according to claim 1, wherein said electret stabilizer comprises at least two compounds selected from the group consisting of a hindered amine compound, a nitrogenous hindered phenol compound, a metallic salt hindered phenol compound, a phenol compound, a sulfur compound and a phosphorus compound and the total content thereof is 0.01 to 0.2% by weight.

4. An antibacterial electret material according to claim 1, wherein said metal-ion-containing inorganic compound comprises a zeolite containing a silver ion.

5. An antibacterial electret material according to claim 1, wherein said metal-ion-containing inorganic compound contains a metal ion selected from the group consisting of silver, copper, zinc, mercury, tin, lead, bismuth, chromium and thallium ions.

6. An antibacterial electret material according to claim 1, wherein said metal-ion-containing inorganic compound comprises a soluble glass containing a silver ion.

7. An antibacterial electret material according to claim 1, whereon said metal-ion-containing inorganic compound comprises a zeolite containing a silver ion and a soluble glass containing a silver ion.

8. An antibacterial electret material according to claim 1, wherein said metal-ion-containing inorganic compound comprises zirconium phosphate containing a silver ion.

9. An antibacterial electret material according to claim 1, which is in the form of a fiber.

10. An antibacterial electret material according to claim 1, which is in the form of a nonwoven fabric.

11. An antibacterial electret material according to claim 1, which is in the form of a film.

12. An antibacterial electret material according to claim 1, which is in the form of paper.

* * * * *